United States Patent
Corley et al.

[11] Patent Number: 6,013,757
[45] Date of Patent: Jan. 11, 2000

[54] COATING OR IMPREGNANT OF EPOXY RESIN AND AQUEOUS POLYAMIDE-AMINE DISPERSION

[75] Inventors: Larry Steven Corley; Derek Scott Kincaid; Glenda Carole Young, all of Houston, Tex.

[73] Assignee: Shell Oil Company, Houston, Tex.

[21] Appl. No.: 08/977,977

[22] Filed: Nov. 25, 1997

Related U.S. Application Data

[62] Division of application No. 08/558,357, Nov. 16, 1995.

[51] Int. Cl.⁷ .......................... B32B 17/04; B32B 27/04; C08L 63/02; C08R 3/20
[52] U.S. Cl. .......................... 528/289; 428/272; 428/413; 428/418; 428/273; 524/607; 524/608
[58] Field of Search .................... 524/607, 608; 528/289; 544/358, 382, 383, 402; 428/272, 273, 413, 418

[56] References Cited

U.S. PATENT DOCUMENTS

| | | | |
|---|---|---|---|
| 3,655,595 | 4/1972 | Higashi et al. | 260/18 |
| 4,070,225 | 1/1978 | Batdorf | 156/330 |
| 4,082,708 | 4/1978 | Mehta | 260/18 N |
| 4,086,197 | 4/1978 | Bouche et al. | 260/18 |
| 4,115,296 | 9/1978 | Andrews | 528/92 |
| 4,188,221 | 2/1980 | Nanpei et al. | 430/288 |
| 4,206,097 | 6/1980 | Drawert et al. | 260/18 EP |
| 4,268,656 | 5/1981 | Ray-Chaudhuri et al. | 528/103 |
| 4,332,711 | 6/1982 | Kooymans et al. | 523/402 |
| 4,362,847 | 12/1982 | Kooijmans et al. | 525/172 |
| 4,569,971 | 2/1986 | Sasse et al. | 525/109 |
| 4,698,396 | 10/1987 | Drawert et al. | 525/420.5 |
| 4,717,746 | 1/1988 | Leoni et al. | 524/100 |
| 5,017,675 | 5/1991 | Marten et al. | 528/111 |
| 5,296,556 | 3/1994 | Frihart | 525/420.5 |
| 5,296,557 | 3/1994 | Frihart | 525/423 |
| 5,301,940 | 4/1994 | Seki et al. | 273/72 R |
| 5,319,004 | 6/1994 | Marten et al. | 523/404 |
| 5,385,986 | 1/1995 | Frihart et al. | 525/420.5 |
| 5,424,371 | 6/1995 | Frihart et al. | 525/420.5 |
| 5,428,083 | 6/1995 | Smith et al. | 523/414 |
| 5,447,785 | 9/1995 | Kishi et al. | 428/229 |
| 5,576,416 | 11/1996 | Walker | 528/340 |
| 5,605,944 | 2/1997 | Heebner | 523/404 |
| 5,612,448 | 3/1997 | Frihart | 528/339.5 |

FOREIGN PATENT DOCUMENTS

| | | |
|---|---|---|
| 0423577 | 10/1989 | European Pat. Off. . |
| 76-48081 | 12/1976 | Japan . |
| 60-219281 | 4/1984 | Japan . |
| 61-73734 | 9/1984 | Japan . |
| 61-62564 | 1/1985 | Japan . |
| 63-29979 | 11/1994 | Japan . |

*Primary Examiner*—Robert E. Sellers
*Attorney, Agent, or Firm*—Y. Grace Tsang

[57] ABSTRACT

A substrate is coated or impregnated with a composition comprising an a) epoxy resin, b) a liquid amine-terminated polyamide curing agent prepared by condensing an aminoalkylpiperazine and a long-chain dicarboxylic acid, ester or chloride, and c) water.

7 Claims, No Drawings

COATING OR IMPREGNANT OF EPOXY RESIN AND AQUEOUS POLYAMIDE-AMINE DISPERSION

This is a division, of application Ser. No. 08/558,357. filed Nov. 16, 1995, allowed.

FIELD OF INVENTION

This invention relates to aqueous dispersions of polyamide-amines. In one aspect, the invention relates to polyamide-amine curing agents for epoxy resin systems useful for waterborne applications.

BACKGROUND OF THE INVENTION

A typical commercial ambient cure epoxy coating contains condensates of dimer acids with polyethylene polyamines containing more than 4 amine hydrogen atoms as a curing agent and a solution of a solid epoxy resin. This epoxy coating system has excellent flexibility adhesion to many substrates, and resistance to water and many types of solvents. However, a problem with this system is that a solvent content of almost 50% is necessary in order to obtain a "sprayable" (Gardner D or lower) viscosity. A large fraction of such solvent evaporates from a coating, or other exposed layer of epoxy resins during cure, and thereby behaves as a volatile organic compound (VOC). Environmentally itis desirable to have low VOC content. However, it is difficult to provide a stable zero VOC aqueous dispersion of polyamine based curing agents having good cured product properties.

Solvent requirements can be reduced considerably by using a system based on liquid epoxy resin with the above polyethylene polyamine curing agent. However, even this approach still requires a system solvent level of about 30% in order to obtain a Gardner "D",or sprayable, viscosity. One way to obtain very low, or in some cases even zero, VOC content is to use a waterborne system. Standard curing agents for waterborne systems, however, are water-soluble or nearly water-soluble adducts of polyamines with epoxy resins, or else Mannich base-type amine curing agents. These materials tend to yield cured films with considerably lower flexibility and impact resistance than those provided by standard solvent-borne epoxy systems cured with polyamide-amine curing agents.

It is therefore an object of the present invention to provide a stable aqueous dispersion of a polyamide-amine curing agent which is useful for waterborne epoxy resin systems.

SUMMARY OF THE INVENTION

According to the invention, an epoxy resin composition is provided comprising:

(a) an epoxy resin having at least 1.5 epoxy groups per molecule;

(b) at least one liquid amine terminated polyamine prepared by reacting at least one long-chain dicarboxylic acid and an aminoalkylpiperazine; and (c) water. The composition is useful as a curing agent for waterborne epoxy resin systems.

DETAILED DESCRIPTION OF THE INVENTION

Accordingly, it is desirable to obtain aqueous polyamide-amine based curing agent useful for curing waterborne epoxy resins. These systems are particularly useful in waterborne epoxy resin impregnation systems and for waterborne epoxy resin coating systems. They tend to provide cured films with higher flexibility and impact resistance (e.g., good peel strength) than that typically given by currently used waterborne curing agents.

The aminoalkylpiperazine-based amine terminated polyamide can be produced by reacting long-chain dicarboxylic acids such as dimerized fatty acids ("dimer acids") or adducts of acrylic and methacrylic acid with unsaturated fatty acids ("adduct acids") with aminoalkylpiperazines under conditions effective to produce a liquid amine terminated polyamide. The resultant polyamines have a number-average amine hydrogen functionality of above 1.7 and up to 4. Preferably the polyamide has an amine plus acid number greater than about 250 and has an excess of amine groups over acid groups.

The aminoalkylpiperazine-based amine terminated polyamide may be prepared by thermal condensation of the aminoalkylpiperazine, preferably in excess, with one or more long-chain dicarboxylic acids or their esters under conditions effective to produce a liquid aminoalkylpiperazine-based amine terminated polyamide. Generally the reaction is carried out at a temperature gradually climbing to a level of above about 200° C., preferably at a final temperature within the range of from about 220° C. to about 260° C., for a time effective to produce a liquid reaction product, followed by distillation, preferably under vacuum, to remove excess unreacted amine, as well as water and/or alcohol reaction product. (The water or alcohol reaction product generally distills at atmospheric pressure before vacuum is applied.) The term "liquid" refers to compositions which have a melting point, or ring and ball softening point (ASTM E28-67) of below room temperature (typically 25° C.). These liquid aminoalkylpiperazine-based amine terminated polyamides are low molecular weight oligomers, typically having number average molecular weight within the range from about 400, preferably from about 700, to about 3000, preferably to about 2000. Alternatively, the amine may be reacted with a chloride of the dicarboxylic acid, but this synthetic procedure is less desirable because of the byproducts produced and the cost of the acid chlorides.

Preferably the long-chain dicarboxylic acid is a dicarboxylic acid having from 18 to 50 carbon atoms. More preferably, the long-chain dicarboxylic acid has from 30 to 40 carbon atoms.

The term "dimer acids" refers to polymeric or oligomeric fatty acids typically made from addition polymerization, using heat and a catalyst, of unsaturated fatty acids, particularly tall oil fatty acids. These polymeric fatty acids typically have the composition of up to about 20% of $C_{18}$ monobasic acids, about 45 to 95 % of $C_{36}$ dibasic acids, and about 1 to 35 % of $C_{54}$ tribasic and higher polymeric acids. The relative ratios of monomer, dimer, trimer and higher polymer in unfractionated dimer acid are dependent on the nature of the starting material and the conditions of polymerization and distillation. Methods for the polymerization of unsaturated fatty acids are described, for example, in U.S. Pat. No. 3,157,681.

Examples of the "adduct acids" include adducts of acrylic acid, methacrylic acid, crotonic acid, etc. with linoleic acid, soybean oil fatty acid, tall oil fatty acid, etc. These adducts are normally prepared by thermal reaction at temperatures $\leq 200°$ C. Methods for the preparation of these adduct acids are described, for example, in U.S. Pat. No. 3,753,968.

Aminoalkylpiperazines can be represented by the following formula:

(I)

where $R^1$ and $R^2$ are each independently —H or —$R^3$—$NH_2$, wherein $R^3$ is a divalent aliphatic-linkage, preferably a chain of —$CH_2$— units with optional —$CHR^4$— or $CR^4R^5$— units, wherein $R^4$ and $R^5$ are independently alkyl groups, provided that at least one of $R^1$ and $R^2$ is —$R^3$—$NH_2$—. The divalent aliphatic linkages preferably have 2–6 carbon atoms.

Examples of the aminoalkylpiperazines include N-(2-aminoethyl)piperazine, N,N'-bis(2-aminoethyl)piperazine and N,N'-bis(3-aminopropyl)piperazine. N-(2-aminoethyl) piperazine and N,N'-bis(2-aminoethyl)piperazine are typical byproducts of the commercial production of ethylene amines from ammonia and ethylene oxide or ethylene dichloride. N,N'-bis(3-aminopropyl)piperazine is prepared by reacting piperazine with acrylonitrile to form N,N'-bis(2-cyanoethyl) piperazine, followed by hydrogenation of the nitrile groups to amine groups. Methods for the preparation of aminoalkylpiperazines are described, for example, in I. Ono, Kag Keizai, 26(6), pp.20–27 (1979), and Q. Sun and C. Zhu, Shanghai DiyiYixueyuan Xuebao, 12(3), pp. 178–182 (1985).

To produce a liquid amine terminated polyamide curing agent one uses a starting ratio of moles of aminoalkylpiperazine to equivalents of carboxyl group in the acid or acid mixture used of greater than 0.75:1, more preferably greater than 0.9:1, still more preferably greater than 1:1.

The amine terminated polyamide curing agent can also be prepared by reacting an aminoalkylpiperazine with one or more long-chain dicarboxylic acids and optionally one or more other dicarboxylic acids. Such other dicarboxylic acid can be any dicarboxylic acid having carbon numbers from 4–20, which can be a long-chain or not a long-chain dicarboxylic such as azelaic acid, sebacic acid, and adipic acid. Preferably, the dicarboxylic acids are all long-chain dicarboxylic acids. A minor amount (up to about 25% of total carboxyl equivalents) of a monocarboxylic acid such as tall oil fatty acid may also be added as a chain terminator. To obtain the amine terminated polyamide curing agent useful for the invention, up to about 50% of the long-chain dicarboxylic acid, a dicarboxylic acid which is not a long-chain dicarboxylic acid can be used depending on the intended use of the product.

To obtain the aqueous dispersion of the curing agent, water is added until the desired percent solids is obtained which is generally from about 5% to about 75% solids content. Generally the amount of the liquid amine terminated polyamide component (b) is from about 30 to about 70 percent by weight, preferably from about 40 to about 60 percent by weight, based on the total dispersion. Generally, (c) water and (b) the liquid amine terminated polyamide are mixed under conditions effective to provide an oil-in-water emulsion. Although stable dispersions will generally form without the use of any surfactant, a surfactant may optionally be added to the mixture of amine terminated polyamide and water in order to modify the Theological behavior of the product dispersion. To obtain zero VOC dispersions, preferably no solvent is added to the emulsion or dispersion.

The curing agent is mixed with a sufficient amount of water to obtain an oil-in-water emulsion. Optimal conditions to prepare these emulsions involve first making a homogeneous mixture with stirring of the polyamide-amine and water at a temperature above about 70° C., preferably above about 80° C., still more preferably above about 90° C., and then cooling the mixture with stirring such that the mixture changes from a solution to an oil-in-water emulsion. Low stirring speeds or even no stirring during cooldown are desirable for a low viscosity product, whereas higher stirring speeds can be used during cooldown if a higher viscosity thixotropic product is desired.

It has been found that the curing agent of the invention readily forms a stable dispersion compared to other amine curing agents such as a polyamide-amine curing agent based on dimer acid, fatty acid, and triethylenetetramine (eg. EPI—CURE® Curing Agent 3115). Preferably the dispersion is produced containing at least from about 35% solids content to about 60% solids content for use in coatings applications. Preferably the dispersion is produced containing at least from about 5% solids content to about 50% solids content for use in cord and fiber impregnations.

The amine terminated polyamide curing agent is present in an amount effective to cure the epoxy resin. The mole ratio of the epoxy resin to liquid amine terminated polyamide curing agent is typically from about 3:1, preferably from about 2:1, to about 1:3, preferably to about 1:2.

An accelerator can be included to increase the cure rate of the epoxy resin-curing agent system. Various amine-compatible accelerators can be used as long as they are soluble in the amine curing agents or water. Examples of accelerators include metal salts such as, for example, sulfonates, phosphonates, sulfates, tetrafluoroborates, carboxylates and nitrates of Groups IA,IIA and transition metal series of the Periodic Table (CAS version), preferably Mg, Ca, Zn and Sn salts, and complexes thereof; inorganic acids such as, for example, $HBF_4, H_2SO_4, H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylic diimide and saccharin.

When the cure rate at the desired temperature is suboptimal, it is preferable to include the accelerator. For example, for adhesive applications and civil engineering applications where application at low temperature is desired, it may be preferable to include the accelerator. It is particularly preferable to include the accelerator if the amine groups are hindered or the concentration of amine groups is low. The accelerators are typically present in an amount of from about 0, preferably from about 0.1, weight percent to about 10 weight percent, preferably to 5 weight percent, based on the epoxy resin.

More preferable accelerators for the invention include, for example, calcium alkylbenzenesulfonates, dicyandiamide, calcium nitrate, magnesium alkanesulfonates, tetrafluoroboric acid, salicylic acid, phenol, dichloroacetic acid, trifluoroacetic acid, and mercaptoacetic acid.

The epoxy resin can be any epoxy resin which can be cured by the amine terminated polyamide curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably Examples of preferred aliphatic glycidyl ethers include those corresponding to the formulas:

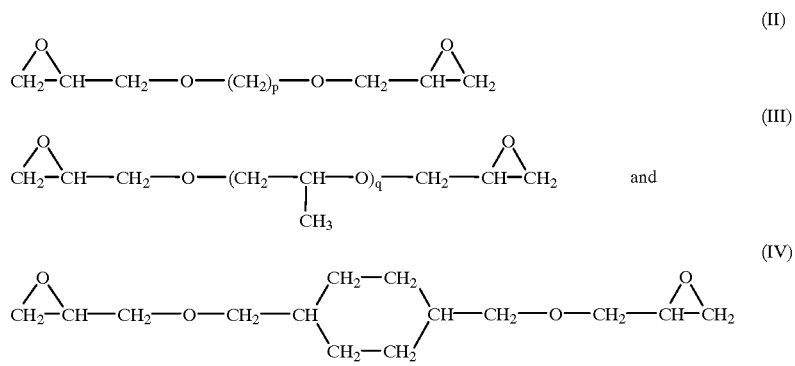

liquid at room temperature. Suitable epoxy resins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

The preferred epoxy resin is a resin based on a polyglycidyl ether of a polyhydric phenol for waterborne coatings, including cathodic electrodeposition, applications (other than highly ultraviolet-resistant topcoats, for which an aliphatic epoxy resin is preferred). Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. Nos. 3,477,990 and 4,734,468. Commercial examples of preferred epoxy resins include, for example, EPON® Resins 862, 828, 826, 825 and 1001 available from Shell Chemical Company.

The preferred epoxy resins for use in impregnation of substrates such as cords and fibers are polyglycidyl ethers of polyhydric phenols (as discussed above) and also polyglycidyl ethers of aliphatic polyols (as discussed below), alone or in combination.

Aliphatic glycidyl ethers can be produced, for example, by reacting an epihalohydrin with an aliphatic diol (optionally containing ether linkages or sulfone linkages) in the presence of a Lewis acid catalyst followed by conversion of the halohydrin intermediate to the glycidyl ether by reaction with sodium hydroxide. Commercial examples of preferred epoxy resins include, for example, HELOXY® Modifiers 32 (a diglycidyl ether of a poly(propylene oxide) glycol), 68 (the diglycidyl ether of neopentyl glycol) and 107 (the diglycidyl ether of 1,4-cyclohexanedimethanol) available from Shell Chemical Company.

wherein:
p is an integer from 2 to 12, preferably from 2 to 6; and
q is an integer from 4 to 24, preferably from 4 to 12.

Examples of suitable aliphatic glycidyl ethers include, for example, diglycidyl ethers of 1,4-butanediol, neopentyl glycol, cyclohexanedimethanol, hexanediol, hydrogenated bisphenol A, and polypropylene glycol; and triglycidylethers of trimethylolethane and trimethylolpropane.

In a typical waterborne application, the epoxy resin is preferably in an aqueous dispersion having a solids content from about 5% to about 75%. Generally, water and an epoxy resin having a functionality of greater than about 1.5 epoxide group per molecule are mixed under conditions effective to provide an oil-in-water emulsion in the presence of from about 1 to about 20 weight percent, based on the epoxy resin, of at least one non-ionic surfactant. Aqueous dispersions of some of these epoxy resins and surfactants used are described in U.S. Pat. Nos. 4,122,067 and 5,236,974 which are hereby incorporated by reference. Preferred commercial examples of these aqueous epoxy resin dispersions are EPI—REZ® Resins 3510-W-60, 3515-W-60, 3522-W-60, 3530-W-70, 3540-WY-510 (all aqueous dispersions of epoxy resins) available from Shell Chemical Company.

The preferred epoxy resin systems of the invention contain one or more epoxy resins, a curing agent containing the amine terminated polyamide, water, and optionally an accelerator. The epoxy resin can be blended or mixed with the aqueous dispersion of the curing agent containing the amine terminated polyamide and optionally the accelerator simultaneously or in any order at a temperature below the cure temperature which is typically below about 100° C.

Further to facilitate handling or application or use in various environments, the curing agent or the epoxy resin system can be diluted with minor amounts of aliphatic, aromatic or cycloaliphatic ketones, alcohols (including glycol ethers) or esters.

The curable epoxy resin composition can be cured at a temperature within the range of from about −40° C., preferably from about −10° C., to about 300° C., preferably to about 250° C., for a time effective to cure the epoxy resin. For standard coating applications the composition is preferably cured at a temperature from about −10° C. to about 75° C. For curing of impregnated cords, yarns or fibers, the composition is preferably cured at a temperature from about 45° C. to about 240° C.

The epoxy resin composition of the invention may include other additives, such as flow control additives such as solvents or anti-sag agents, as well as other additives such as pigments, reinforcing agents, fillers, elastomers, stabilizers, extenders, plasticizers, anti-foaming agents, and flame retardants depending on the application. The epoxy resin composition is useful for coatings, as adhesives, and for sizing or impregnating substrates such as sheets, cords, yarns and prepregs for various applications.

For coating applications, the curable epoxy resin composition can also contain pigments of the conventional type such as iron oxides, lead oxides, strontium chromate, carbon black, titanium dioxide, talc, barium sulfate, phthalocyanine blue and green, cadmium red, chrome green, lead silicate, silica, silicates and the like. Such pigments can be added to the polyamide curing agent component or the epoxy resin component prior to mixing them together. However, iron blue pigment, calcium carbonate and pigments considered reactive because of their basic nature are not compatible in the epoxy resin coating system when used in appreciable quantities. These normally are added to the curing agent component only. Defoamers, tints, slip agents, thixotropes, etc., are common auxiliary components to most coatings and may be employed in the epoxy resin composition of the present invention.

The curable coating composition can be applied to a substrate by brush, spray, or rollers. One of the advantages of the coating system of the invention is the lower solvent content (i.e., less than about 35%) of the curable coating composition.

For impregnation, the curable epoxy resin composition or latex can optionally contain thixotropic agents and halogenated phenolic compounds (the latter especially for printed wiring board uses). The composition can be impregnated on a cord, fiber or yarn substrate (hereinafter "cord substrates") such as nylon, polyester, fiberglass, graphite and aramid, and then cured. These cord substrates are dipped in a curable epoxy resin composition and then cured. These cord substrates can be dipped once, twice or even three times in a dipping zone in a prepolymer or a resinous solution and then dried and/or cured. In the present embodiment at least one of these dipping or impregnation steps is carried out with the aqueous curable epoxy resin system of the invention. The aqueous curable epoxy resin composition can be used with any conventional cord treater. The curable epoxy resin system is preferably dried and cured at a temperature effective to cure the epoxy resin system which is generally at a temperature within the range of about 45° C. to about 240° C. These impregnated cords are useful as reinforcing cords or as fiber-rubber composites to be used with a thermoset elastomer matrix for belt cord, hose cord, tire cord and tow in various fields of applications, including automotive, industrial, agricultural and domestic.

ILLUSTRATIVE EMBODIMENT

The following illustrative embodiments describe the process of the invention and are provided for illustrative purposes and are not meant as limiting the invention.

Example 1 demonstrates the preparation of the liquid aminoalkylpiperazine-based amine terminated polyamine. Examples 2–7 demonstrate use of the aqueous dispersion of aminoalkylpiperazine-based amine terminated polyamide as curing agent. Dimer acid (~10% $C_{18}$ monobasic acids, ~80% $C_{36}$ dibasic acids, ~10% $C_{54}$ tribasic acids) was obtained from Shell Chemical Co. N-(2-aminoethyl)piperazine was obtained from Dow Chemical Co. EPON® Resin 828 (a diglycidyl ether of bisphenol A having epoxy equivalent weight of 185–192), EPON® Resin 1001 (an oligomeric diglycidyl ether of bisphenol A having epoxy equivalent weight of 450–550), EPI-REZ® Resin WD-510 (a water dispersible bisphenol A-based epoxy resin with an epoxide equivalent weight of 190–205), EPI-REZ® Resin 3510-W-60 (an aqueous dispersion, 60% solids, of a bisphenol A-based epoxy resin with an epoxide equivalent weight of approximately 185–215), EPI-REZ® Resin 3515-W-60 (an aqueous dispersion, 60% solids, of a bisphenol A-based epoxy resin with an epoxide equivalent weight of 225–275), EPI-REZ® Resin 3522-W-60, (an aqueous dispersion, 60% solids, of a bisphenol A-based epoxy resin with an epoxide equivalent weight of 625–745), EPI-REZ® Resin 3530-W-70 (an aqueous dispersion, 70% solids, of an epoxy resin with an epoxide equivalent weight of approximately 250), EPI-REZ® 3540-WY-55 (an aqueous dispersion, 55% solids, of a bisphenol A-based epoxy resin with an epoxide equivalent weight of 1600–2000) were obtained from Shell Chemical Company.

HELOXY® Modifier 9 (a glycidyl ether of a mixture of 1-dodecanol and 1-tridecanol having an epoxy equivalent weight of 275–295) and HELOXY® Modifier 32 (a diglycidyl ether of a mixture of oligomers of propylene oxide with an epoxide equivalent weight of 305–335) were obtained from Shell Chemical Company. EPI—CURE® Curing Agent 3140 (a polyamide-amine curing agent based on dimer acid, fatty acid, and triethylenetetramine) and EPI—CURE® Curing Agent 3125 (a polyamide-amine curing agent based on dimer acid, fatty acid, and a mixture of polyethylenepolyamines) were obtained from Shell Chemical Company.

EXAMPLE 1

Preparation of low amine hydrogen functionality liquid amine terminated polyamide by reaction of dimerized fatty acid with excess aminoalkylpiperazine "Dimer acid" with a Gardner viscosity of Z4-¼, (carboxyl equivalent weight of between approximately 280 and 290) from the Shell Chemical Company, was mixed in the ratios indicated in Table 1 below with N-(2-aminoethyl)piperazine (AEP), in 5-liter round-bottom flasks equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped or had essentially stopped. Vacuum was then applied and vacuum distillation of excess amine was carried out until the pot temperature had risen back to 220 –240° C. and the rate of amine offtake had become essentially negligible. Vacuum stripping was then continued at this temperature for approximately another 15 minutes. The products were then allowed to cool to about 150° C. under vacuum or under a stream of nitrogen and were then poured into jars. The products were characterized by amine nitrogen content (by titration) and viscosity. Results are shown in Table 1 below.

TABLE 1

| Run# | 1 | 2 |
|---|---|---|
| Amine used | AEP | AEP |
| grams | 1695 | 1725 |
| moles | 13.118 | 13.12$^e$ |

TABLE 1-continued

| Run# | 1 | 2 |
|---|---|---|
| Dimer acid, | | |
| grams | 1837.5 | 1837.5 |
| —COOH equivalents | 6.358 | 6.42 |
| Reactant ratio, moles amine/eq COOH | 2.06 | 2.04 |
| Reaction time, hours | 6.5 | 3.7 |
| Atmospheric pressure distillate, g | 129.36 | 155.26 |
| Vacuum distillate, grams | 902.3 | 898.2 |
| Final reaction temperature/ pressure [a] | 238° C./13 Pa | 235° C./17 Pa |
| Nonvolatile product, grams | 2460.9 | 2481.3 |
| Amine nitrogen content, %, by titration | 6.69 | 6.86 |
| Amine nitrogen content, %, theoretical [b] | 7.00 | 7.00 |
| Amine equiv. wt.[c] | 209.4 | 210.6 |
| Amine hydrogen equiv. wt.[d] | 284.8 | 288.3 |
| Ubbelohde kinematic viscosity, 40° C., $mm^2/sec$ | 22400 | 22300 |

[a] Curing agents were prepared by mixing dimer acid with amine in a round-bottom flask equipped with a paddle stirrer, thermocouple and distilling head. The mixtures were heated (under nitrogen) to slow reflux for approximately 2 hours, followed by distillation at atmospheric pressure and finally stripping under pump vacuum at the temperature and pressure indicated above.
[b] Calculated for product composed solely of condensation product of one molecule of dimer acid and two molecules of amine.
[c] Calculated from amine nitrogen content determined by titration.
[d] For polyamides made with AEP, the amine hydrogen equivalent weight was calculated by dividing the number average molecular weight (calculated from amine nitrogen content determined by titration) by 3 (with the assumption that the —NH$_2$ and —NH groups have equal reactivity toward the dimer acid so that the average polyamide molecule contains 3 amine hydrogens).
[e] From amine nitrogen content determined by titration (this lot of AEP apparently contained approximately 2% water)

EXAMPLE 2

This example covers the use of an AEP-dimer acid condensate in a waterborne dispersion A 1-liter kettle was fitted with a paddle stirrer, a thermocouple and an addition funnel. To the kettle were added 100.0 grams of the product of Example 1, run #2. To the addition funnel were added 150.0 grams of deionized water for a total of 250.0 grams. The kettle was heated to 88° C. and kept at this temperature with stirring. Water was then metered in from the addition funnel over a 30 minute period. After the water was added, the mixture was held at 88° C. with stirring for an additional 30 minutes. The product was then poured into a glass bottle and stored for further characterization and used in Examples below. The product, at 40% solids, had a room temperature viscosity (Brookfield RVT, spindle #5) of 21 Pa.s (21000 cp).

The product was then mixed, at the ratio indicated in system #2 of Table 2 below, with a dispersion (50% in water) of a mixture of 80% EPI-REZ® Resin WD-510 (a material analogous to EPON® Resin 828 but containing a surfactant system for water dispersibility) and 20% HELOXY® Modifier 9. A comparative non-waterborne system (system #1) contained a mixture of 80% EPON® Resin 828 and 20% HELOXY® Modifier 9, cured with the product of Example 1, run #2, at the same solids ratio as in the waterborne counterpart. The systems were applied to adhesive testing coupons made of aluminum or of fiberglass tape. The adhesive bonds were cured 1 hour at 100° C. Performance properties are shown in Table 2 below.

One can see from Table 2 below that the waterborne system provided similar high values of adhesive peel strength to those given by the neat control, both for aluminum and fiberglass tape substrates. For both systems, failure occurred in the fiberglass tape substrate rather than in the adhesive layer. The use of water dispersions also allowed a considerable reduction in mixed system viscosity.

TABLE 2

| System# | 1 | 2 |
|---|---|---|
| Resin Composition | | |
| EPON ® Resin 828 | 80 | |
| HELOXY ® Modifier 9 | 20 | 20 |
| EPI-REZ ® Resin WD-510 | | 80 |
| Water | | 100 |
| Curative Component, phr (based on resin solids) | | |
| Product of Example 1, run #2 | 182 | |
| Water dispersion of curing agent prepared in text above | | 455 phr dispersion (182 phr solids) |
| Handling Characteristics[a] | | |
| Resin Solids | 100% | 50% |
| Curative Solids | 100% | 40% |
| System Solids | 100% | 43% |
| Resin Viscosity, mPa · s | 600[f] | 45[g] |
| Curative Viscosity, mPa · s | 138000[f] | 21000[g] |
| System Viscosity, mPa · s | 19600[f] | 11200[g] |
| Combining Ratio by volume | 1.82:1 | 2.27:1 |
| Pot life, 100 gram mass[b] | 45 minutes | 55 minutes |
| Performance Properties[c] | | |
| Aluminum-Aluminum Peel Adhesion[d] | 2.5 N/mm (14 pli) | 2.1 N/mm (12 pli) |
| Fiberglass Peel Adhesion[e] | >13 N/mm (75 pli)[h] | >13 N/mm (75 pli)[h] |

[a] All systems tested at 25° C.
[b] Time to gel as determined by manual probing with a tongue depressor.
[c] Systems cured 1 hour @ 100° C., tested at 25° C., crosshead speed 50.8 cm/minute (20 inch/minute).
[d] 0.127 mm (5 mil) aluminum, acid etched.
[e] Tetraglas Plain tape, 1.59 mm (1/16") x 50.8 mm (2") E-grade fiberglass.
[f] Viscosities measured by Brookfield RVT, spindle #29.
[g] Viscosities measured by Brookfield RVT, spindle #5.
[h] Failure occurred in the fiberglass tape substrate.

EXAMPLE 3

Use of waterborne AEP-based amine-terminated "polyamide" in comparison with other "polyamide" curing agents in adhesives for aluminum and poly(ethylene terephthalate) films A mixed epoxy resin dispersion in water was prepared at room temperature as follows. A 3-liter reaction kettle was equipped with an anchor stirrer thermocouple and condenser. To the kettle were added 113.4 grams of a 32% aqueous solution of a surfactant made by reacting EPON® Resin 1001 with 8000 molecular weight poly(ethylene oxide) glycol. To the surfactant, with stirring, were added 491 grams of EPON® Resin 828 over a period of 25 minutes. To this mixture, with stirring, were added 122.6 grams of HELOXY® Modifier 9 over the next 25 minutes. Heating was then started and stirring was continued for another 1.5 hours; the temperature at that point had reached 45° C. Stirring was continued for another hour with the addition of 275 grams of deionized water. At the end of this period the temperature had dropped to 31° C. Stirring was continued for an additional 45 minutes as the temperature was brought up to 54° C. The mixture was kept at this temperature with stirring for another hour. At the end of this period, heating was removed and stirring was continued for another hour as the mixture cooled to room temperature. The final product had a Brookfield viscosity of 2.2 Pa.s and a number-average particle diameter of 690 nm. It is referred to as "Waterborne Resin Mixture A" in the experiments in the remainder of this example.

Three "polyamide" curing agent dispersions in water were prepared as follows. A 1-liter reaction kettle was equipped with an anchor stirrer, thermocouple and condenser. To the kettle were added 200 grams of amine-terminated "polyamide" curing agent (AEP-dimer acid "polyamide," EPI-CURE® Curing Agent 3125 or EPI-CURE® Curing Agent 3140). (The batch of AEP-dimer acid "polyamide" used in this example was prepared at the same reactant ratio of ~2 moles AEP/carboxyl equivalent of dimer acid as the two batches in Example 1 and under similar conditions, but on a 30-kilogram scale.) The curing agent was heated to 100° C. To the curing agent were then added 300 grams of water over approximately 10 minutes with stirring maintained at a speed of 60 rpm. Heating maintained the reactor temperature at 97–100° C. during this time. After water addition was complete, heating was withdrawn and stirring was continued at 30–60 rpm as the mixture was allowed to cool. When the reactor temperature reached 83° C., stirring was stopped and the mixture was allowed to cool to room temperature without stirring. The aqueous dispersion prepared from the AEP-dimer acid "polyamide" appeared smooth, milky and evenly opaque. The corresponding dispersions prepared from EPI-CURE® Curing Agents 3125 and 3140 appeared grossly heterogeneous, with some parts of the liquid appearing translucent and others appearing opaque. The dispersions prepared from EPI-CURE® Curing Agents 3125 and 3140 also, when diluted with water, appeared to contain some large particles visible to the naked eye. The dispersions prepared from EPI-CURE® Curing Agents 3125 and 3140 also were higher in viscosity than that prepared from the AEP-dimer acid polyamide (Table 3 below).

The above aqueous dispersions of curing agents were mixed with Waterborne Resin Mixture A in the ratios indicated in Table 3 below (believed to be near-stoichiometric) and the mixed resin-curing agent dispersions were coated on adhesive test coupons of aluminum or polyethylene terephthalate (PET), using a steel drawdown blade to produce wet coatings 0.025 mm thick. The water was flashed off the wet films in a 60° C. oven for 5 minutes. After drying, the coated substrates were then placed together, laminated between sheets of release paper, and pressure rolled by hand. The adhesive bonds were cured 16 hours at room temperature followed by 1 hour at 100° C. Adhesion properties are shown in Table 3 below (runs #4, 5 and 6). For comparison, corresponding neat (non-waterborne) mixtures were made by combining a mixture of EPON® Resin 828 and HELOXY® Modifier 9 (same ratio as in Waterborne Resin Mixture A, but without water) with the AEP-dimer acid polyamide or EPI-CURE® Curing Agents 3125 or 3140 without water. Solids ratios of resin and curing agent were the same as for the corresponding waterborne systems. The non-waterborne comparative systems are runs #1, 2 and 3 in Table 3.

One can see from Table 3 that, for both the neat and waterborne systems, the adhesive peel strength is much greater for the resin cured with the AEP-dimer acid polyamide than for the same resin cured with the standard commercial polyamide curing agents EPI-CURE® 3125 and 3140. This was the case both for the aluminum and poly (ethylene terephthalate) substrates.

TABLE 3

| Run # | 1 | 2 | 3 | 4 | 5 | 6 |
|---|---|---|---|---|---|---|
| Curing agent dispersion preparation: | | | | | | |
| AEP-dimer polyamide, parts | | | | 200 | | |
| EPI-CURE Curing Agent 3125, parts | | | | | 200 | |
| EPICURE Curing Agent 3140, parts | | | | | | 200 |
| Water, parts | | | | 300 | 300 | 300 |
| Brookfield viscosity of dispersion, room temperature, Pa · s | | | | 24 | 78 | 37.5 |
| Dispersion appearance | | | | Opaque, smooth | Translucent and opaque zones | Translucent and opaque zones |
| Resin composition: | | | | | | |
| EPON Resin 828/HELOXY Modifier 9 blend, parts | 100 | 100 | 100 | | | |
| Waterborne Resin Mixture A, parts | | | | 154 | 154 | 154 |
| Curing agent composition: | | | | | | |
| AEP-dimer polyamide, parts | 171 | | | | | |
| EPI-CURE Curing Agent 3125, parts | | 48 | | | | |
| EPI-CURE Curing Agent 3140, parts | | | 44 | | | |
| Waterborne curing agent prepared above in same column, parts | | | | 428 | 120 | 110 |
| Adhesion properties:[a] | | | | | | |
| Aluminum-aluminum, T-peel, N/mm | 2.12 | 0.35 | 0.14 | 1.24 | 0.25 | 0.28 |
| PET-PET, T-peel, N/mm | >6.7[b] | <0.05 | <0.05 | >0.70[b] | 0.07 | 0.05 |

[a]T-peel adhesion measured per ASTM D-1876 at 25.4 cm/minute.
[b]Failure occurred in PET film substrate.

EXAMPLE 4

Use of product of Example 1, run #2, in formulating waterborne coatings based on aqueous dispersions of different epoxy resins A dispersion ("Curing Agent Dispersion" in Table 4 below) of 40 parts of the product of Example 1, run #2, in 60 parts by weight of water was prepared by the same technique used in Example 2. This dispersion was mixed with different waterborne epoxy resins as indicated in Table 4 below and the mixed resin-curing agent aqueous dispersions were coated onto cold rolled steel using a doctor blade, producing wet films 5 mils (0.025 mm) thick. The films were allowed to dry at room temperature or alternatively were cured for 1 hour at 100° C. Film properties are shown in Table 4 below.

TABLE 4

| Run# | 1 | 2 | 3 | 4 | 5 | 6 |
|---|---|---|---|---|---|---|
| Composition: | | | | | | |
| EPI-REZ Resin 3515-W-60[a], parts | 167 | | | | | |
| EPI-REZ Resin 3522-W-60[b], parts | | 167 | | | | |
| EPI-REZ Resin 3530-W-70[c], parts | | | 143 | | | |
| EPI-REZ Resin 3540-WY-55[d], parts | | | | 182 | | |
| EPI-REZ Resin WD-510[e], parts | | | | | 80 | |
| HELOXY ® Modifier 9[f], parts | | | | | 20 | |
| Water, parts | | | | | 100 | |
| EPI-REZ Resin 3510-W-60[g], parts | | | | | | 135.67 |
| HELOXY Modifier 32[h], parts | | | | | | 14.33 |
| Above curing agent dispersion, parts | 368 | 138 | 368 | 50 | 455 | 428 |
| Films cured 1 hour at 100° C.: | | | | | | |
| Film appearance | Orange peel | Orange peel | Slight orange peel | Smooth | Heavy orange peel | Orange peel |
| Film clarity | Clear | Clear | Slightly cloudy | Clear | Clear | Clear |
| Pencil hardness | 3H | 3H | 1H | 3H | 1H | 3H |
| Films cured at room temperature: | | | | | | |
| Film appearance | Smooth | Smooth | Smooth | Smooth | Heavy orange peel | Smooth |
| Film clarity | Clear | Cloudy | Cloudy | Cloudy | Clear | Clear |
| Tack after 2 hours | Slight | None | None | None | Tacky | Tacky |
| Pencil hardness after 24 hours | 3B | 3B | <6B | HB | <6B | 1H |

[a]An aqueous dispersion (60% solids) of a bisphenol A-based epoxy resin with an epoxide equivalent weight of 225–275.
[b]An aqueous dispersion (60% solids) of a bisphenol A-based epoxy resin with an epoxide equivalent weight of 625–745.
[c]An aqueous dispersion (70% solids) of an epoxy resin with an epoxide equivalent weight of approximately 250.
[d]An aqueous dispersion (55% solids) of a bisphenol A-based epoxy resin with an epoxide equivalent weight of 1600–2000.
[e]A water-dispersible bisphenol A-based epoxy resin with an epoxide equivalent weight of 190–205.
[f]A mixture of dodecyl and tridecyl glycidyl ethers with an epoxide equivalent weight of 275–295.
[g]An aqueous dispersion (60% solids) of a bisphenol A-based epoxy resin with an epoxide equivalent weight of 185–215.
[h]A mixture of diglycidyl ethers of oligomers of propylene oxide with an epoxide equivalent weight of 305–335.

EXAMPLE 5

Use of an aqueous dispersion of the product of Example 1, run #1, to cure an aqueous epoxy resin dispersion in a paper saturant system Five parts of the AEP-dimer acid polyamide prepared in Example 1, run #1, were dispersed in 95 parts of distilled water (using heat and a magnetic stirring bar) to make a cloudy but apparently stable dispersion. To 165.6 grams of this dispersion were added 10 grams of a 60% by weight aqueous dispersion of the diglycidyl ether of bisphenol A with a solids epoxy equivalent weight of approximately 250 (EPI-REZ® Resin 3515-W-60 from Shell Chemical Company). The resultant resin-curing agent dispersion contained 8.1% by weight total resin system solids.

A control slurry of 11.4 grams of a commercial polyamide curing agent, EPI-CURE® Curing Agent 3140 from Shell Chemical Company, and 11.4 grams of water was prepared. To this slurry was added 50 grams of EPI-REZ® Resin 3515-W-60 as above. The mixture was stirred until thoroughly mixed. Additional water (214.6 grams) was added to yield a final aqueous dispersion containing 15% by weight total resin system solids.

Whatman No. 4 chromatography paper was cut into 7"×7" (17.8 cm×17.8 cm) pieces. The pieces of paper were saturated with the two water dispersions above by pan dipping. The water was flashed from the papers by hanging them in a forced air oven at 66° C. for 15 minutes. The oven temperature was then increased to 149° C. for 10 minutes to cure the resin. The papers were weighed before and after resin dipping and heat treatment. The cured resin add-on was 22±2% by weight for the papers dipped in both resin-curing agent water dispersions. The cured paper-resin composites were then cut into 1"×4" (2.5 cm×10.2 cm) strips. The strips were tested for tensile properties (ASTM D-882) using an Instron tensile test machine. Some of the strips were then soaked for 10 minutes in water or methyl ethyl ketone (MEK), and the tensile properties of the soaked strips were determined by the same procedure. Results are shown in Table 5 below. The system containing the product of Example 1, run #1, shows higher tensile elongation than the control system under all three test conditions, although its tensile strength and modulus are lower as would be expected for an inherently less rigid system.

TABLE 5

| Paper saturant system | EPI-REZ Resin 3515-W-60 water dispersion of product of Example 1, run #1 | EPI-REZ Resin 3515-W-60 water dispersion of EPI-CURE Curing Agent 3140 |
|---|---|---|
| R.T. tensile properties of resin-saturated paper: (ASTM D-882) Dry: | | |
| Strength, MPa | 18.2 | 24.2 |
| Modulus, MPa | 1415 | 1740 |
| Elongation, % | 4.3 | 3.7 |
| After water soak: | | |
| Strength, MPa | 9.2 | 15.7 |
| Modulus, MPa | 222 | 59.5 |
| Elongation, % | 10.2 | 7.4 |
| After MEK soak: | | |
| Strength, MPa | 8.0 | 11.3 |
| Modulus, MPa | 266 | 355 |
| Elongation, % | 6.4 | 5.1 |

EXAMPLE 6

Use of product of Example 1, run #1, in formulating waterborne coatings

The polyamide-amine curing agents shown in Table 6 below were each slurried with an equal weight of water to form a dispersion for easier mixing with a waterborne epoxy resin dispersion. To the curing agent slurries were then added amounts of EPI-REZ® Resin 3510-W-60 (a 60% by weight aqueous dispersion of the diglycidyl ether of bisphenol A with a solids epoxide equivalent weight of approximately 200) as shown in Table 6 below. Viscosities of the mixed resin-curing agent dispersions were determined periodically with a Brookfield viscometer. After being allowed to stand for an induction period of 30 minutes, the dispersions were coated onto cold rolled steel panels using a 2 mil (0.05 mm) drawdown blade. One panel of each set was allowed to remain at room temperature and the state of drying of the coating was periodically evaluated. Other panels were baked for 30 minutes at 121° C. and film properties were evaluated as shown in Table 6 below.

One can see from Table 6 that the invention compositions showed much more rapid coating dry time at room temperature than the control system cured with EPI-CURE® Curing Agent 3140. The heat-cured invention compositions likewise were much harder (pencil hardness F versus 5B) than the control composition and also had greater resistance to methyl ethyl ketone (MEK).

TABLE 6

| Formulation | 1 | 2 | 3 |
|---|---|---|---|
| EPI-REZ ® Resin 3510-W-60, parts | 25 | 25 | 25 |
| Product of Example 1, run #1, parts | 26.2 | 22.5 | |
| EPI-CURE ® Curing Agent 3140, parts | | | 7.1 |
| Water (pre-slurried with curing agent), parts | 26.2 | 22.5 | 7.1 |
| Viscosity (mPa · s, Brookfield) at indicated time: | | | |
| Immediately after mixing | 93500 | 91500 | 18000 |
| 30 minutes | 23300 | 15900 | 18300 |
| 60 minutes | 1300 | 4200 | 18000 |

TABLE 6-continued

| Formulation | 1 | 2 | 3 |
|---|---|---|---|
| 90 minutes | 1100 | 2700 | 19000 |
| 120 minutes | 900 | 2500 | 18500 |
| Dry times (hours), room temperature: | | | |
| Tack free | <4 | <4 | >24 |
| Cotton free | 4 | 4 | (>24) |
| Through dry | 22 | 14.5 | (>24) |
| Baked film properties (30 min. @ 121° C.): | | | |
| Pencil hardness (ASTM D3363) | F | F | 5B |
| MEK resistance, double rubs | >100 | >100 | 50 |
| Direct impact, J (ASTM D2794) | >160 | >160 | >160 |
| Reverse impact, J (ASTM D2794) | 160 | 160 | >160 |

EXAMPLE 7

Use of an aqueous dispersion of the product of Example 1, run #1, to cure an aqueous epoxy resin dispersion in an adhesive formulation A mixed epoxy resin dispersion was prepared at room temperature as follows. A 1-liter reaction kettle was equipped with an anchor stirrer, thermocouple and condenser. To the kettle were added 89.4 grams of a 32% aqueous solution of a surfactant made by reacting EPON Resin 1001 with 8000 molecular weight poly(ethylene oxide) glycol and 30.8 grams of additional water. To this mixture, with stirring, were added 480.9 grams of EPON® Resin 828 over a period of 1.5 hours. At the end of this period, phase inversion had occurred to form an oil-in-water emulsion. Stirring was continued for an additional 30 minutes. During the following 30 minutes, 150 grams of HELOXYO Modifier 32 were added to the mixture, with continued stirring. At the end of this period, 292.8 grams of additional water were added to this mixture, likewise with stirring. The final product had a solids content of 62.1% and is referred to as "Waterborne Resin Mixture B" in the experiments in the remainder of this example.

Water slurries of different amine-functional curing agents were prepared by stirring the curing agent together with water in the relative amounts indicated in Table 7 below. To the water dispersions of curing agents were added, with stirring, portions of Waterborne Resin Mixture B in the amounts indicated in Table 7 below. The mixed resin-curing agent dispersions were then each coated with a #40 wire wound metering bar onto three sets of T-2024 aluminum adhesive testing coupons (76.2 cm×25.4 cm×1.5 mm) which had been previously etched for 20 minutes at 60° C. with a solution consisting of 30% sulfuric acid, 15% iron(III) sulfate, and 55% water by weight. The water contained in the resin-curing agent dispersions was flashed off each set of coupons at 66° C. for 15 minutes before the coupons were assembled together. The adhesive bond between the coupons was cured at 121° C. for 20 minutes. Lap shear strength of the specimens was then determined by a method based on ASTM D-1002. From Table 7 below, one can see the increased lap shear resistance of the invention systems (#1 and #3) based on the curing agent product of Example 1, run #1, in comparison with the control system #2 based on EPI-CURE® Curing Agent 3055 (an amidoamine curing agent based on the reaction product of a nondimerized fatty acid with a polyethylenepolyamine from Shell Chemical Co.).

TABLE 7

| Formulation | 1 | 2 | 3 |
|---|---|---|---|
| Waterborne Resin Mixture A, parts | 47.5 | 47.5 | 47.5 |
| Product of Example 1, run #1, parts | 51.4 | | |
| EPI-CURE ® Curing Agent 3055, parts | | 12.6 | |
| Blend of 85% (wt.) product of Example 1, run #1, and 15% (wt.) N-(2-aminoethyl)piperazine, parts | | | 39.9 |
| Additional water, parts (used for forming curing agent dispersion) | 172 | 81.9 | 145.6 |
| Baked film properties (30 min. @ 121° C.): Room temperature lap shear strength, MPa (ASTM D-1002) | 14.8 ± 1.2 | 9.6 ± 3.1 | 16.3 ± 0.9 |

We claim:

1. A cord substrate impregnated with a curable epoxy resin composition comprising:
   (a) an epoxy resin having at least 1.5 epoxy groups per molecule;
   (b) a liquid amine terminated polyamide prepared by reacting at least one $C_{18-50}$ dicarboxylic acid, dicarboxylic acid ester or dicarboxylic acid chloride and an amine compound consisting of an aminoalkylpiperazine; and
   (c) water;
   wherein said polyamide is mixed with water to provide an oil-in-water emulsion when preparing said composition.

2. The composition of claim 1 wherein the cord substrate is selected from the group consisting of nylon, polyesters, fiberglass, graphite, and aramids.

3. The composition of claim 2, wherein the aminoalkylpiperazine is N-(2-aminoethyl)piperazine.

4. A cured composition of claim 1.

5. The composition of claim 1 wherein the substrate is selected from the group consisting of nylon, polyesters, fiberglass, graphite, and aramids.

6. A substrate coated with a curable epoxy resin composition comprising:
   (d) an epoxy resin having at least 1.5 epoxy groups per molecule;
   (e) a liquid amine terminated polyamide prepared by reacting at least one $C_{18-50}$ dicarboxylic acid, dicarboxylic acid ester or dicarboxylic acid chloride and an amine compound consisting of an aminoalkylpiperazine; and
   (f) water;
   wherein said polyamide is mixed with water to provide an oil-in-water emulsion when preparing said composition.

7. A cured composition of claim 6.

* * * * *